Oct. 22, 1935.  W. F. HAYES  2,018,444
AUTOMOBILE ROOF CONSTRUCTION
Filed April 4, 1932
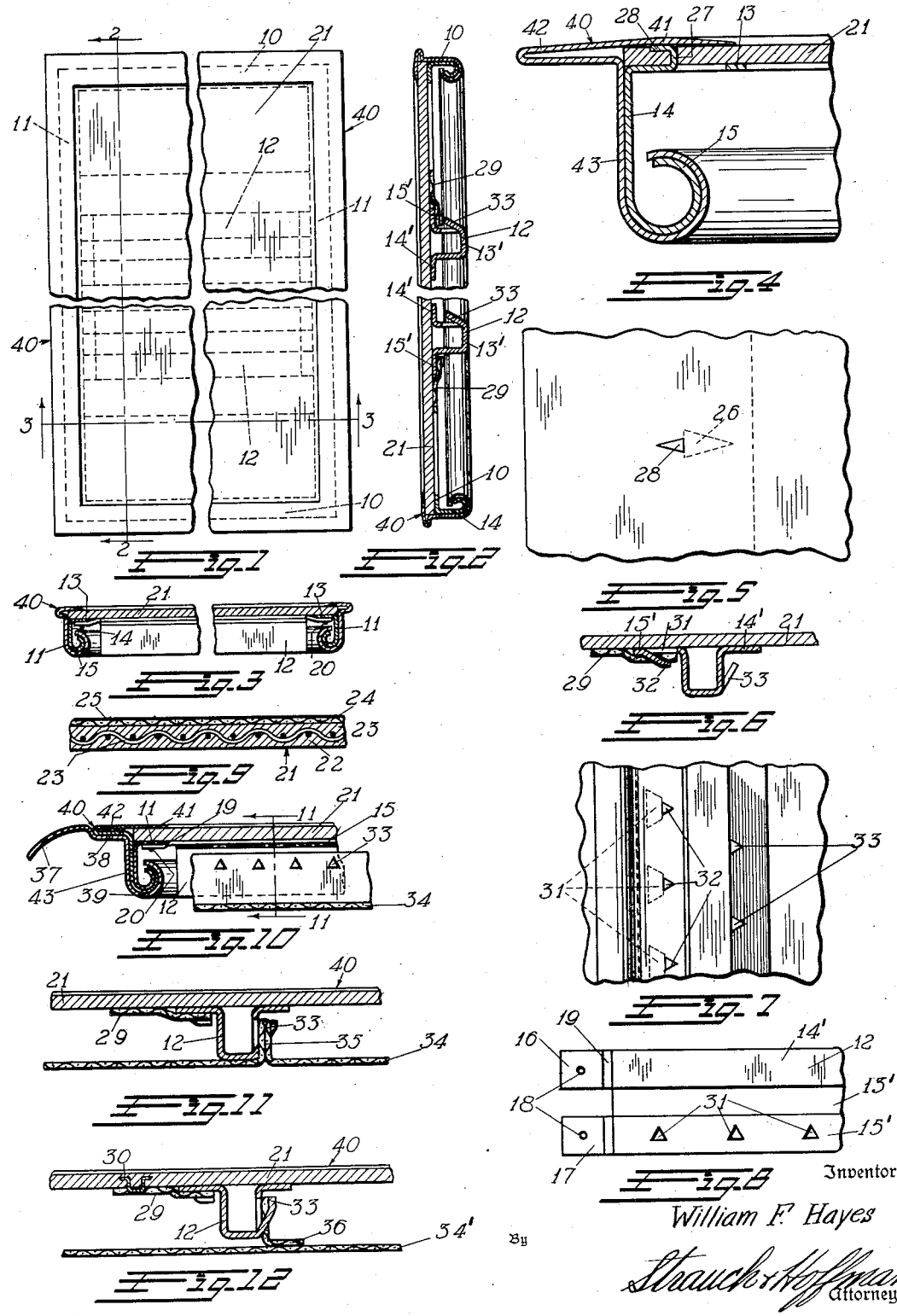
Inventor
William F. Hayes Patented Oct. 22, 1935

2,018,444

UNITED STATES PATENT OFFICE 2,018,444

AUTOMOBILE ROOF CONSTRUCTION

William F. Hayes, Detroit, Mich., assignor to Gagnier Fibre Products Company, Detroit, Mich., a corporation of Michigan Application April 4, 1932, Serial No. 603,149

6 Claims. (Cl. 296—137)

This invention relates to an automobile roof construction, particularly of the type that includes a single panel constituting substantially the entire roof of the vehicle. More particularly, this invention relates to the construction of an automobile roof of a unitary character, in which the parts entering into the roof construction are assembled in fixed relation to each other without the use of extraneous fasteners.

In Patent #1,842,283, granted January 19, 1932, there is disclosed an automobile roof construction including a unitary roof panel, that is assembled with respect to the automobile by bringing about an interlocking between the metallic frame surrounding the opening that is intended to receive the panel and the metallic frame of such panel without the use of extraneous fasteners. The present invention relates to an improvement in roofs of the character of said patent, in providing simple and effective means for securing the parts constituting the roof panel together without use of bolts, screws, rivets or the like.

Another object of the invention is to provide a roof panel construction including an open metallic frame and a cover for the frame, in which the cover is anchored to the intermediate members of the frame, as well as the side and end members thereof, by means which does not penetrate the cover, and that may be applied expeditiously by utilizing projections, struck or otherwise integrally formed with the frame members, to hold the cover in place upon the frame.

A further object of the invention is to provide a novel way of securing the lining for the inside of the roof to the panel frame members, so that the lining is held effectively by means that are invisible from the interior of the automobile.

Still another object of the invention is to provide a roof panel construction including a roof and frame and a fibrous cover to the frame, in which the fibrous cover is provided with an outer or surface layer of a material capable of being successfully treated with the same finishing paint or coating that is customarily used upon the metallic parts of the body, to the end that the roof panel may be finished in precisely the same color as the metallic parts of the automobile with which the roof is associated.

Further objects of the invention will appear as a description thereof proceeds with reference to the accompanying drawing in which:

Figure 1 is a plan view of a roof panel constructed in accordance with the present invention, parts thereof being broken away.

Figure 2 is a sectional view taken on the plane indicated by the line 2—2 in Figure 1.

Figure 3 is a sectional view taken on the plane indicated by the line 3—3 in Figure 1 in the direction of the arrows.

Figure 4 is an enlarged fragmentary sectional view of a side or end of the panel showing the preferred way of securing the cover to the metallic frame of the roof panel adjacent the sides and ends thereof.

Figure 5 is a plan view of the parts appearing in Figure 4, with the exception of the molding, which has been omitted to expose the cover securing means.

Figure 6 is a fragmentary sectional view through an intermediate frame member of a roof panel constructed in accordance with the present invention.

Figure 7 is a view showing the parts appearing in Figure 6 as seen from beneath the roof panel.

Figure 8 is a fragmental detail view of the channel-shaped members showing a preferred way of attaching said members to the side frame member.

Figure 9 is a fragmental sectional view of a preferred form of covering for the roof panel.

Figure 10 is a fragmental sectional view showing the roof frame of the present invention interlocked with respect to a frame member of the automobile body, and illustrating a preferred way of attaching the lining for the inside of the roof to the intermediate frame members.

Figure 11 is a fragmental sectional view taken on the plane indicated by the line 11—11 in Figure 10.

Figure 12 is a view similar to Figure 11 showing a modification.

Like reference characters indicate like parts throughout the several views.

The roof panel of the present invention consists of a metallic frame, consisting of ends 10, sides 11 and a plurality of intermediate frame members 12 extending transversely of the panel at spaced intervals along the length thereof. The side and end members 10 and 11 are preferably constructed of angular form, providing a horizontally disposed flange 13, presenting a shelf upon which the cover for the panel is disposed, and a vertical web 14. In order to increase the strength of the angular frame member the web 14 is bent to form a bead 15, said bead also serving to provide a means, whereby a molding may be interlocked with respect to the frame of the panel, and whereby the panel itself may be interlocked with respect to a frame surrounding the opening in which the roof panel is disposed as described in my above referred to patent. The ends 10 and sides 11 may be welded or otherwise secured together at the corners of the frame. Preferably, the intermediate members 12 are constructed of flanged channels, each member consisting of a channel portion 13' and flanges 14' and 15' projecting laterally of the channel portion 13' in opposite directions. Each of said intermediate members is formed so that the flanges 14' and 15' of said members project substantially endwise beyond the channel 13', as illustrated in Figure 8 of the drawing, providing attaching flanges 16 and 17 that may be perforated at 18 for attachment to the side frame members 11. The flanges 16 and 17 may be offset as indicated at 19 so that said flanges may be secured against the under surface of the horizontal flange 13 of a side frame member with the flanges 14' and 15' of the intermediate member 12 located in the same plane as the horizontally disposed flange 13. The intermediate members may be secured to the side frame members as by rivets 20, Figures 3 and 10, passing through the perforations 18 and corresponding openings in the horizontal flange 13. The intermediate members may be secured to the side frame members in any other convenient manner. Said members with the end and side members form an open frame for a unitary roof panel that is intended to constitute substantially the entire roof of the automobile.

The open frame of the roof panel thus provided is covered by means of a unitary sheetlike cover 21, which is cut to the desired size and preferably applied to the open frame by means of a press, or the like, that will give to the sheet like cover the necessary camber, if such is desired. Preferably the frame is disposed on the press bed so that the unitary cover 21 may be shaped upon the frame and firmly pressed into contact with the frame members thereof.

The cover 21 is preferably constructed of a body 22 of relatively stiff cardboard which may or may not be reinforced with a wire fabric 23, Figure 9, to increase the stiffness and the strength of said body. Preferably, the body 22 and the cover 21 have a surface layer 24 of suitable fabric material that is adhesively applied to the outer surface of said body. The fabric 24 preferably is similar in structure to oil cloth and has applied to its exposed surface a coating composition 25 of any nature to render the cover waterproof and nonabsorbent of moisture. Preferably, the outer coating 25 is of a character that may be coated with the ordinary coating composition, that are applied to the metal work of automobile, so that the roof or cover may be painted the same shade or color as the metallic bodies of the automobile to which it may be applied, utilizing the same coating composition to attain this end.

It is desirable that the cover 21 be firmly secured to the frame of the panel at intervals along the sides and ends of the panels and along the lengths of the intermediate members, to the end that the cover be maintained in firm contact with the frame at all points thus preventing bulging of the roof and vibration of the cover with a differing period of vibration from the frame, when the roof panel has been applied to an automobile that is put into use. To this end means are provided for securing the cover to the frame without the use of separate fastening elements such as bolts, screws, rivets or the like, that will require the alignment of perforations in superposed members, which alignment is always difficult to secure in actual practice. In order to secure the cover 21 to the side and end members, the horizontal flanges 13 thereof are provided with preferably V-shaped slits 26 (Figure 5) separating metallic tongues or projections from said frame. Such slits are formed at intervals along the length of the side and end members of the frame, aand prior to the application of cover 21 are bent so as to project substantially at right angles to the flange 13 as shown at 27 (Figure 4). Upon application of the cover to the frame in the manner above described, the tongues or projections 27 are caused to penetrate the fibrous material constituting a cover 21 and the ends 28 of said tongues are crimped upon and forced into the outer surface of the cover thus firmly holding the cover upon the side and end members at spaced intervals around the periphery thereof.

In order that the cover may be held in firm contact with the intermediate member 12, the cover is preferably provided with strips 29 of suitable fabric, paper or the like that are adhesively secured to the under surface thereof in proper position so that when the cover is assembled upon the frame of the panel, said strips will parallel the intermediate members 12 and be disposed closely adjacent thereto. While it is preferred that one edge of the strip 29 be continuously adhesively secured to the underside of the cover by suitable cement, said strips may be secured to the cover by means of staples 30, the legs of 35 which do not penetrate completely through the cover 21 is illustrated in Figure 12 of the drawing.

After the cover has been applied to the side and end members of the frame, as above described, the strips 29 are firmly secured to the intermediate frame members 12 by means of projections forming an integral part of the sheet metallic frame members. This is preferably accomplished by forming at intervals along the length of the flange 15' of intermediate member 12 a series of V-shaped slits 31 separating tongues of this configuration from a flange of the intermediate member. Said tongues are preferably bent at right angles to the frames of the flanges prior to the incorporation of the intermediate members in the frame of the panel, and, after the cover has been applied thereto, the free edges thereof are brought into overlapping relation to the adjacent flanges of the panel frame and are hooked upon the V-shaped tongues or projections 32. Said tongues or projections are then bent toward the flange of the panel by any suitable tool, thus serving to place the strips 29 under tension and thus hold the cover 21 in contact with the flanges of the panel upon which it rests. Similar strips may be applied to the under surface of the cover so that both flanges of the panel may be united to the cover, though one strip for each intermediate member is generally sufficient in this regard.

It will be understood that by this arrangement the strips 29 may be secured to the intermediate members with great expedition without the use of extraneous fastening elements, and that the strips are held under tension to which they are subjected when the tongues 32 are bent toward the flanges from which they are struck.

In order to facilitate the attachment of the linings of the inside of the roof after the roof panel has been interlocked with respect to the automobile body, the intermediate members 12 of the frame of the roof panel are formed so as to present tongues 33, preferably V-shaped in side elevation, to permit the ready attachment of said linings when the interior of the body is being completed.

Preferably, the lining 34 which may be of any character, consists of a suitable cloth or fabric, as is customary in the art, provided with a pleat or fold 35, Figure 11, formed by doubling a relatively short portion of the fabric at the point where it is to be united to the transverse frame member 12. Preferably the portions of the fold are secured together by a suitable adhesive so that the fold is substantially invisible from the interior of the automobile body. Such pleat or fold 35 is forced upon the tongues 33 which project at substantial right angles to the frame member 12, prior to the application of the lining 34, and which are subsequently bent so as to clamp the pleat or fold between the side wall of the panel 12 and the tongue 33 after the latter has been caused to penetrate the fabric. The linings may be secured to the side and ends of the car body in the manner described in my application Serial Number 447,953 filed April 28th, 1930, or in any other approved manner.

If so desired, the lining may be connected to the intermediate frame members of the roof panel in the manner illustrated in Figure 12 of the drawing, if a lining 34' devoid of seams or folds is desired. In this form of the invention a strip 36, that is adhesively secured to the inside of the lining, adjacent the intermediate frame member 12 is used. One edge of the strip 36 is maintained free of attachment to the lining and said edge is forced upon the outwardly projecting tongues 33, which are then bent upwardly to firmly hold the lining in place without the use of extraneous fasteners of any kind.

In the use of the present invention, it will be understood that the roof panel is constructed as a separate unit and brought to completed form before the panel is secured to the automobile body, and that the intermediate members 12 are provided with the tongues 33 to subsequently receive the lining, the lining being attached when the interior of the body is being completed, and after the roof panel has been permanently assembled with respect to the body. In order that the panel, after completion, may be readily assembled with respect to the body, the body is provided with a frame surrounding the roof opening that is intended to receive the roof panel, which frame is formed as illustrated in cross section in Figure 10 of the drawing. As shown in this figure, the frame constitutes a portion 37 which may form a part of the side or end of the body, an offset portion 38 and a channel 39 shaped to receive the bead 15 of the panel frame member, as well as a molding 40, which may be, and preferably is, applied to the edge of the roof panels and secured thereto by being bent around said bead 15. Said molding includes a horizontally extending portion 41, that laps and covers when the molding is in operative position, the tongues or projections 28 which extend through the cover 21. Said molding also includes further a portion 42 that covers the line of juncture between the roof panel and frame and a downwardly extending flange 43. The lower edge of said flange is bent around the bead 15 in assembling the molding with respect to the panel as described in my patent above referred to.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as my invention is:

1. In an automobile roof panel consisting of an open metallic frame including side, end and intermediate members, said sides, end, and intermediate members being rigidly secured together, a cover for said frame constructed of a single piece of relative stiff and flat material, and means to secure said cover under tension to said intermediate members without penetration of said cover, said means substantially limiting motion of said cover to movements as a unit with said frame.

2. The combination defined in claim 1 in which said last named means consists of strips paralleling said intermediate members and secured continuously to the inside of said cover, said strips being secured to said members by tongues struck therefrom.

3. An automobile roof panel comprising an open metal frame, a cover for the frame in the form of a unitary sheet of relatively stiff and flat material, strips extending along a portion of said frame and secured under tension to said cover so as to prevent substantial vibration of said cover relative to said frame, and integral means struck from said portion of the frame securing said strips thereto.

4. An automobile roof panel comprising an open metallic frame including side, end and intermediate frame members rigidly secured together, a cover for said frame in the form of a unitary sheet of relatively stiff and flat material, and means including tongues struck from said members to secure said cover to said side, end and intermediate frame members so as to prevent substantial movement of said cover in any direction with respect to said members.

5. In an automobile roof panel construction, a metallic flanged channel constituting an open frame member, a unitary relatively stiff cover resting on the flanges of the channel, intermediate frame members rigidly secured to said frame, a strip adhesively secured to said cover adjacent said last named members, and means to secure said strips under tension to said intermediate frame members for securing the body of said cover against substantial vibration with respect to said frame.

6. An automobile roof panel comprising an open frame consisting of side and end frame members defining the edges of the panel and intermediate frame members rigidly secured to and reinforcing said edge defining members, a unitary cover of stiff fibrous material lapping all of said frame members, means to secure the edges of said cover to said edge defining frame members, and strips applied under tension to secure the body of said cover to said intermediate frame members without perforation of said cover and so that said cover is prevented from freely vibrating with a different period than that of said open frame.

WM. F. HAYES.